United States Patent
Khakhulin et al.

(10) Patent No.: US 12,169,900 B2
(45) Date of Patent: Dec. 17, 2024

(54) METHOD AND APPARATUS FOR THREE-DIMENSIONAL RECONSTRUCTION OF A HUMAN HEAD FOR RENDERING A HUMAN IMAGE

(71) Applicant: SAMSUNG ELECTRONICS CO., LTD., Suwon-si (KR)

(72) Inventors: Taras Andreevich Khakhulin, Pyatigorsk (RU); Vanessa Valerievna Sklyarova, Moscow (RU); Victor Sergeevich Lempitsky, Moscow (RU); Egor Olegovich Zakharov, Krasnogorsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 17/987,586

(22) Filed: Nov. 15, 2022

(65) Prior Publication Data

US 2023/0154111 A1 May 18, 2023

Related U.S. Application Data (63) Continuation of application No. PCT/KR2022/015750, filed on Oct. 17, 2022.

(30) Foreign Application Priority Data

Nov. 15, 2021 (RU) .......................... RU2021133083
Mar. 24, 2022 (RU) .......................... RU2022107822

(51) Int. Cl.
*G06T 15/00* (2011.01)
*G06T 7/70* (2017.01)
(Continued)

(52) U.S. Cl.
CPC .............. *G06T 17/205* (2013.01); *G06T 7/70* (2017.01); *G06T 9/00* (2013.01); *G06V 10/761* (2022.01);
(Continued)

(58) Field of Classification Search
CPC .... G06N 3/0464; G06N 3/0455; G06N 3/091; G06N 3/045; G06T 7/70;
(Continued)

(56) References Cited

U.S. PATENT DOCUMENTS 7,835,568 B2  11/2010  Park et al.
9,679,412 B2  6/2017  Park et al.
(Continued)

FOREIGN PATENT DOCUMENTS

CN   109377544 A   2/2019
CN   113886639 A   1/2022
(Continued)

OTHER PUBLICATIONS

Khakhulin T, Sklyarova V, Lempitsky V, Zakharov E. Realistic one-shot mesh-based head avatars. InEuropean Conference on Computer Vision Oct. 23, 2022 (pp. 345-362). Cham: Springer Nature Switzerland.*

(Continued)

*Primary Examiner* — Phu K Nguyen
(74) *Attorney, Agent, or Firm* — Sughrue Mion, PLLC (57) ABSTRACT

A method of three-dimensional reconstruction of human heads using a single photo in the form of polygonal mesh, with animation and realistic rendering capabilities for novel head poses is provided. The method includes encoding, by using a first convolutional neural network, a single source image into a neural texture; estimating, by a pre-trained detailed expression capture and animation (DECA) system, a face shape, a facial expression, and a head pose by using
(Continued)

the single source image and a target image, and providing an initial mesh; providing a predicted mesh of a head mesh based on the initial mesh and the neural texture; rendering a human image by using the predicted mesh.

11 Claims, 5 Drawing Sheets

(51) Int. Cl.
 *G06T 9/00* (2006.01)
 *G06T 17/20* (2006.01)
 *G06V 10/74* (2022.01)
 *G06V 10/82* (2022.01)
 *G06V 40/16* (2022.01)

(52) U.S. Cl.
 CPC ............ *G06V 10/82* (2022.01); *G06V 40/174* (2022.01); *G06T 2207/30201* (2013.01)

(58) Field of Classification Search
 CPC ........... G06T 2207/30201; G06T 17/20; G06T 15/04; G06T 9/00; G06T 17/205; G06V 10/82; G06V 40/174; G06V 10/761
 USPC ......................................................... 345/418
 See application file for complete search history.

(56) References Cited

U.S. PATENT DOCUMENTS

| | | | |
|---|---|---|---|
| 10,796,480 | B2 | 10/2020 | Chen et al. |
| 10,818,043 | B1* | 10/2020 | Barnes ...................... G06T 7/40 |
| 10,891,789 | B2 | 1/2021 | Lysenkov |
| 11,222,466 | B1* | 1/2022 | Naruniec ............. G06V 40/167 |
| 11,816,404 | B2* | 11/2023 | Müller .................... G06F 30/20 |
| 11,989,846 | B2* | 5/2024 | Lombardi ................ G06T 17/20 |
| 2005/0063582 | A1 | 3/2005 | Park et al. |
| 2007/0031028 | A1 | 2/2007 | Vetter et al. |
| 2018/0158240 | A1 | 6/2018 | Saito et al. |
| 2023/0326137 | A1* | 10/2023 | Ceylan Aksit .......... G06T 17/20 |
| 2023/0401824 | A1* | 12/2023 | Khan ..................... G06V 20/70 |

FOREIGN PATENT DOCUMENTS

| | | |
|---|---|---|
| EP | 1 982 292 | 1/2008 |
| EP | 2 852 932 | 11/2013 |
| RU | 2 358 319 C2 | 6/2009 |
| RU | 2 755 396 C1 | 9/2021 |
| WO | 2017/026839 A1 | 2/2017 |
| WO | 2017/223530 A1 | 12/2017 |

OTHER PUBLICATIONS

Thies J, Zollhöfer M, Nießner M. Deferred neural rendering: Image synthesis using neural textures. Acm Transactions on Graphics (TOG). Jul. 12, 2019;38(4):1-2.*

Blanz et al., "Face Identification across Different Poses and Illuminations with a 3D Morphable Model" Proceedings of Fifth IEEE International Conference on Automatic Face Gesture Recognition, pp. 202-207, 2002, (6 pages total).

Blanz et al., "A Morphable Model For The Synthesis of 30 Faces", SIGGRAPH 99, 1999, (8 pages total).

Bulat et al., "How far are we from solving the 2D & 3D Face Alignment problem? (and a dataset of 230,000 3D facial landmarks)". arXiv:1703.07332v3 [cs.CV]. Sep. 7, 2017, (14 pages total).

Cao et al., "VGGFace2: A dataset for recognising faces across pose and age", 2018 13th IEEE International Conference on Automatic Face & Gesture Recognition, 2018, arXiv:1710.08092v2 [cs.CV], (11 total pages).

Lifelike avatars for the metaverse. itSeez3D, https://avatarsdk.com/, 2022, (3 pages total).

Chung et al., "VoxCeleb2: Deep Speaker Recognition", In Interspeech, arXiv:1806.05622v2 [cs.SD]. Jun. 27, 2018, (6 pages total).

Doukas et al., "HeadGAN: Video-and-Audio-Driven Talking Head Synthesis", arXiv:2012.08261v1 [cs.CV], Dec. 15, 2020, (12 pages total).

Egger et al., "3D Morphable Face Models—Past, Present and Future", ACM Transactions on Graphics. arXiv:1909.01815v2 [cs.CV]. Apr. 16, 2020 (39 pages total).

Feng et al., "Learning an Animatable Detailed 3D Face Model from In-The-Wild Images", ACM Transactions on Graphics, arXiv:2012.04012v2, Jun. 2, 2021, (22 pages total).

Goodfellow et al., "Generative Adversarial Nets", In NIPS, arXiv:1406.2661v1 [stat.ML], Jun. 10, 2014, (9 pages total).

Guo et al., "Towards Fast, Accurate and Stable 3D Dense Face Alignment", In Proceedings of the European Conference on Computer Vision (ECCV), arXiv:2009.09960v2 [cs.CV], Feb. 7, 2021, (22 pages total).

Halko et al., "Finding Structure With Randomness:Probabilistic Algorithms for Constructing Approximate Matrix Decompositions", SIAM Rev., arXiv:0909.4061v2 [math.NA], Dec. 14, 2010, (74 pages total).

Hassner et al., "Effective Face Frontalization in Unconstrained Images", arXiv:1411.7964v1 [cs.CV], Nov. 28, 2022, (10 pages total).

He et al., "Deep Residual Learning for Image Recognition", arXiv:1512.03385v1 [cs.CV], Dec. 10, 2015, (12 pages total).

Johnson et al., "Perceptual Losses for Real-Time Style Transfer and Super-Resolution", In ECCV, arXiv:1603.08155v1 [cs.CV], Mar. 27, 2016, (18 pages total).

Kellnhofer et al., "Neural Lumigraph Rendering", IEEE/CVF Conference on Computer Vision and Pattern Recognition (CVPR), arXiv:2103.11571v1 [cs.CV], Mar. 22, 2021, (17 pages total).

Kim et al., "Deep Video Portraits", ACM Transactions on Graphics (TOG), arXiv:1805.11714v1 [cs.CV], May 29, 2018. (14 pages total).

Kingma et al., "ADAM: A Method for Stochastic Optimization", Published as a conference paper at ICLR 2015, arXiv:1412.6980v9 [cs.LG], Jan. 30, 2017, (15 pages total).

Laine et al., "Modular Primitives for High-Performance Differentiable Rendering", ACM Transactions on Graphics, arXiv:2011.03277v1 [cs.GR]. Nov. 6, 2020, (14 pages total).

Li et al., "Learning a model of facial shape and expression from 4D scans", ACM Transactions on Graphics (TOG), vol. 36, No. 6, Article 194, Nov. 2017, (17 pages total).

Liu et al., "Soft Rasterizer: A Differentiable Renderer for Image-based 3D Reasoning",IEEE/CVF International Conference on Computer Vision (ICCV), arXiv:1904.01786v1 [cs.CV], Apr. 3, 2019, (15 pages total).

Lombardi et al., "Deep Appearance Models for Face Rendering", ACM Transactions on Graphics (TOG), vol. 37, No. 4, Article 68, arXiv:1808.00362v1 [cs.GR], Aug. 2018. (13 total pages).

Lombardi et al., "Neural Volumes: Learning Dynamic Renderable Volumes from Images", ACM Transactions on Graphics (TOG), vol. 38, No. 4, Article 65, arXiv:1906.07751v1 [cs.GR], Jun. 18, 2019, (14 pages total).

Lombardi et al., "Mixture of Volumetric Primitives for Efficient Neural Rendering", ACM Transactions on Graphics (TOG), vol. 40, No. 4, Article 59, arXiv:2103.01954v2 [cs.GR], May 6, 2021, (13 pages total).

Ma et al., "SCALE: Modeling Clothed Humans with a Surface Codec of Articulated Local Elements", In CVPR, arXiv:2104.07660v1 [cs.CV], Apr. 15, 2021. (17 pages total).

Mescheder et al., "Which Training Methods for GANs do actually Converge?", ICML, arXiv:1801.04406v4 [cs.LG], Jul. 13, 2018, (39 pages total).

Mildenhall et al., "NeRF: Representing Scenes as Neural Radiance Fields for View Synthesis", ECCV, arXiv:2003.08934v2 [cs.CV], Aug. 3, 2020, (25 pages total).

Milletari et al., "V-Net: Fully Convolutional Neural Networks for Volumetric Medical Image Segmentation", 2016 Fourth Interna- (56) References Cited

OTHER PUBLICATIONS tional Conference on 3D Vision (3DV), arXiv:1606.04797v1 [cs.CV], Jun. 15, 2016, (11 pages total).
Oechsle et al., "UNISURF: Unifying Neural Implicit Surfaces and Radiance Fields for Multi-View Reconstruction", ArXiv, abs/2104.10078, 2021, (11 pages total).
Park et al., "DeepSDF: Learning Continuous Signed Distance Functions for Shape Representation", IEEE/CVF Conference on Computer Vision and Pattern Recognition (CVPR), arXiv:1901.05103v1 [cs.CV], Jan. 16, 2019, (19 pages total).
"The Most Advanced AI-Driven Virtual Avatars", Pinscreen, https://www.pinscreen.com/, 2020, (5 pages total).
Ramon et al., "H3D-Net: Few-Shot High-Fidelity 3D Head Reconstruction", arXiv:2107.12512v1 [cs.CV], Jul. 26, 2021, (10 pages total).
Ravi et al., "Accelerating 3D Deep Learning with PyTorch3D", arXiv:2007.08501, Jul. 16, 2020, (18 pages total).
Ronneberger et al., "U-Net: Convolutional Networks for Biomedical Image Segmentation", MICCAI, arXiv:1505.04597v1 [cs.CV], May 18, 2015, (8 pages total).
Saito et al., "PIFuHD: Multi-Level Pixel-Aligned Implicit Function for High-Resolution 3D Human Digitization", IEEE/CVF Conference on Computer Vision and Pattern Recognition (CVPR), https://shunsukesaito.github.io/PIFuHD/, Apr. 1, 2020, (10 pages total).
Siarohin et al., "First Order Motion Model for Image Animation", 33rd Conference on Neural Information Processing Systems (NeurIPS 2019), arXiv:2003.00196v3 [cs.CV], Oct. 1, 2020, (20 pages total).
Sorkine, "Laplacian Mesh Processing", STAR—State of The Art Report. The Eurographics Association, 2005, (18 pages total).
Su et al., "Blindly Assess Image Quality in the Wild Guided by A Self-Adaptive Hyper Network", EEE/CVF Conference on Computer Vision and Pattern Recognition (CVPR), https://github.com/SSL92/hyperIQA, 2020, (10 pages total).
Thies et al., "Deferred Neural Rendering: Image Synthesis using Neural Textures", Computer Vision and Pattern Recognition. arXiv:1904.12356v1 [cs.CV]. Apr. 28, 2019, (12 pages total).
Thies et al., "Face2Face: Real-time Face Capture and Reenactment of RGB Videos", Computer Vision and Pattern Recognition (CVPR), IEEE, arXiv:2007.14808v1 [cs.CV], Jul. 29, 2020, (12 pages total).
Tran et al., "Regressing Robust and Discriminative 3D Morphable Models with a very Deep Neural Network", 2017 IEEE Conference on Computer Vision and Pattern Recognition (CVPR), arXiv:1612.04904v1 [cs.CV], Dec. 15, 2016. (10 pages total).
Wang et al., "High-Resolution Image Synthesis and Semantic Manipulation with Conditional GANs", 2018 IEEE/CVF Conference on Computer Vision and Pattern Recognition, arXiv:1711.11585v2 [cs.CV], Aug. 20, 2018. (14 pages total).
Wang et al., "One-Shot Free-View Neural Talking-Head Synthesis for Video Conferencing", 2021 IEEE/CVF Conference on Computer Vision and Pattern Recognition (CVPR), Nvidia Corporation, arXiv:2011.15126v3 [cs.CV], Apr. 2, 2021, (16 pages total).
Zakharkin et al., "Point-Based Modeling of Human Clothing", ArXiv, abs/2104.08230, 2021, (10 pages total).
Zakharov et al., "Fast Bi-layer Neural Synthesis of One-Shot Realistic Head Avatars", ECCV, V arXiv:2008.10174v1 [cs.CV], Aug. 24, 2020, (34 pages total).
Zakharov et al., "Few-Shot Adversarial Learning of Realistic Neural Talking Head Models", 2019 IEEE/CVF International Conference on Computer Vision (ICCV), arXiv:1905.08233v2 [cs.CV], Sep. 25, 2019, (21 pages total).
Zuffi et al., "Three-D Safari: Learning to Estimate Zebra Pose, Shape, and Texture from Images "In the Wild"", arXiv:1908.07201v2 [cs.CV], Sep. 17, 2019, (10 pages total).
International Search Report and Written Opinion dated Jan. 26, 2023, issued by the International Searching Authority in International Application No. PCT/KR2022/015750 (PCT/ISA/220, 210, 237).
Feng et al., "Learning an Animatable Detailed 3D Face Model from In-The-Wild Images," ACM Transactions on Graphics, vol. 40, No. 4, Article 88, Jul. 19, 2021, Total 14 pages.
Xiang et al., "NeuTex: Neural Texture Mapping for Volumetric Neural Rendering," 2021 IEEE/CVF Conference on Computer Vision and Pattern Recognition (CVPR), pp. 7115-7124, Jun. 20-25, 2021, Total 11 pages.
Dou et al., "End-to-end 3D face reconstruction with deep neural networks," 2017 IEEE Conference on Computer Vision and Pattern Recognition (CVPR), pp. 1503-1512, Jul. 21-26, 2017, Total 11 pages.
Khakhulin et al., "Realistic One-shot Mesh-based Head Avatars," https://doi.org/10.48550/arXiv.2206.08343, Jun. 16, 2022, Total 30 pages.
Communication dated Nov. 22, 2022, issued by the Russian Patent Office in Russian Application No. 2022107822.
Ravi et al., "Accelerating 3D Deep Learning with PyTorch3D," arXiv:2007.08501v1 [cs.CV], Jul. 16, 2020, Total 18 pages.
Feng et al., "Learning an Animatable Detailed 3D Face Model from In-The-Wild Images," arXiv:2012.04012v1 [cs.CV], Dec. 7, 2020, Total 22 pages.
Thies et al., "Deferred Neural Rendering: Image Synthesis using Neural Textures", arXiv:1904.12356v1 [cs.CV], Apr. 28, 2019, Total 12 pages.
Sanyal et al., "Learning to Regress 3D Face Shape and Expression from an Image without 3D Supervision," arXiv:1905.06817v1 [cs.CV], May 16, 2019, Total 10 pages.
Lin et al., "Towards High-Fidelity 3D Face Reconstruction from In-the-Wild Images Using Graph Convolutional Networks," arXiv:2003.05653v3 [cs.CV], Jul. 13, 2020, Total 10 pages.
Thies et al., "Face2Face: Real-time Face Capture and Reenactment of RGB Videos," arXiv:2007.14808v1 [cs.CV], Jul. 29, 2020, Total 12 pages.
Wang et al., "One-Shot Free-View Neural Talking-Head Synthesis for Video Conferencing," arXiv:2011.15126v1 [cs.CV], Nov. 30, 2020, Total 16 pages.
Zakharov et al., "Fast Bi-layer Neural Synthesis of One-Shot Realistic Head Avatars," arXiv:2008.10174v1 [cs.CV], Aug. 24, 2020, Total 34 pages.
Zakharov et al., "Few-Shot Adversarial Learning of Realistic Neural Talking Head Models," arXiv:1905.08233v2 [cs.CV], Sep. 25, 2019, Total 21 pages.
Communication dated Nov. 17, 2022, issued by the Russian Patent Office in Russian Application No. 2022107822.
Communication issued Oct. 22, 2024 by the European Patent Office in European Patent Application No. 22893047.5.

\* cited by examiner

METHOD AND APPARATUS FOR THREE-DIMENSIONAL RECONSTRUCTION OF A HUMAN HEAD FOR RENDERING A HUMAN IMAGE

CROSS-REFERENCE TO RELATED APPLICATIONS

This application is a continuation application of International Application No. PCT/KR2022/015750, filed Oct. 17, 2022, which claims priority to Russian Patent Application No. 2021133083, filed on Nov. 15, 2021, and Russian Patent Application No. 2022107822, filed on Mar. 24, 2022, the disclosures of which are herein incorporated by reference in their entireties.

BACKGROUND

1. Field

Embodiments of the disclosure relate to computer vision, deep neural networks, and a three-dimensional (3D) image reconstruction.

2. Description of the Related Art

Three-dimensional (3D) face reconstruction has been actively developed over decades for face tracking and alignment, face recognition, and generative modelling. In all these scenarios, statistical mesh-based models (or parametric models) remain one of the widely used tools. Such models impose a strong prior on the space of possible reconstructions. The parametric models for human heads consist of rigged meshes which support a diverse range of animations with rigid motions for jaw, neck, and eyeballs, as well as via disentangled shape and expression coefficients. However, they only provide reconstructions for face, ears, neck, and forehead regions, which limits the range of applications. The inclusion of full head reconstruction (e.g., hair and clothing) into these parametric models is possible, but in order to do that, current approaches require significantly more training data to be gathered in the form of 3D scans. A method according to the disclosure is to leverage existing large-scale datasets of in-the-wild videos via a learning-by-synthesis paradigm without using any additional 3D scans.

Neural 3D Human Head Models.

While parametric models provide sufficient reconstruction quality for many downstream applications, they are not able to model very fine details that are needed for photorealistic modeling. In recent years, approaches have been made to model the very complex geometry and/or appearance of humans using high-capacity deep neural networks. Some of these works use strong human-specific priors. Others fit high-capacity networks to data without the use of such priors. The methods in this class differ by the type of data structure used to represent the geometry, namely, mesh-based, point-based, and implicit models.

Mesh-based models arguably represent the most convenient class of methods for downstream applications. They provide better rendering quality and better temporal stability than point-based neural rendering. Also, unlike methods based on implicit geometry, mesh-based methods allow to preserve topology and rigging capability, and are also much faster during fitting and/or rendering. However, currently, mesh-based methods either severely limit the range of deformations, making it infeasible to learn complex geometry like hair or clothing, or operate in the multi-shot scenario and require an excessive number of 3D scans as training data. The method according to the disclosure is also mesh-based, but it allows the prediction of complex deformations without 3D supervision, thereby lifting the limitations of the related art methods.

One-Shot Neural Head Models.

Advances in neural networks also led to the development of methods that directly predict images using large ConvNets operating in the 2D image domain, with effectively no underlying 3D geometry or with very coarse 3D geometry. These methods achieve state-of-the-art realism, use in-the-wild images or videos with no 3D annotations for training, and may create avatars from a single image. However, the lack of an explicit geometric model, makes these models incompatible with many real-world applications, and limits the span of camera poses that may be handled by these methods.

Neural Mesh Rendering.

Recently, approaches that combine explicit data structures (point clouds or meshes) with neural image generation have emerged. For mesh-based geometry, this method has been pioneered and popularized by the Deferred Neural Rendering system. This class of methods also benefit from the recent advances in differentiable mesh rendering. Neural mesh rendering uses 2D convolutional networks to model complex photometric properties of surfaces, and achieves high realism of renders with fine details even when such details are missing in the underlying geometric model. In this work, these advances are adapted to human head modeling and combined with learning from large datasets of in-the-wild videos.

SUMMARY

According to one or more example embodiments of the disclosure, a method, an apparatus, and a system capable of creating realistic personalized human head models in a rigged mesh format from a single photograph are provided.

According to an aspect of an example embodiment of the disclosure, provided is a method for three-dimensional (3D)-reconstruction of a human head for rendering a human image, the method being performed by a device including at least one processor and at least one memory, the method including: a) encoding, by using a first convolutional neural network, a single source image into a neural texture, the neural texture having a same spatial size as the single source image and a larger number of channels than the single source image, the neural texture containing local person-specific details; b) estimating, by a pre-trained detailed expression capture and animation (DECA) system, a face shape, a facial expression, and a head pose by using the single source image and a target image, and providing an initial mesh as a set of faces and a set of initial vertices based on a result of the estimating; c) providing a predicted mesh of a head mesh based on the initial mesh and the neural texture; and d) rasterizing 3D reconstruction of a human head based on the predicted mesh, and rendering a human image based on a result of the rasterizing.

The providing the predicted mesh may include: rendering the initial mesh into an xyz-coordinate texture; concatenating the xyz-coordinate texture and the neural texture; processing, by using a second neural network, a result of the concatenating into a latent geometry map; and providing the predicted mesh by using the latent geometry map.

The providing the predicted mesh by using the latent geometry map may include: bilinear sampling the latent geometry map by using texture coordinates to obtain a vertex-specific feature; decoding the vertex-specific feature by a multi-layer perceptron for predicting a 3D offset for each vertex; and adding the predicted 3D offset to the initial vertices to obtain the predicted mesh.

The rendering may include processing a result of the rasterizing by using a third neural network to obtain a predicted image and a segmentation mask.

The rendering may include reconstructing the predicted image and the segmentation mask based by comparing the predicted image and the segmentation mask with a ground-truth image and a mask of the ground-truth image via a photometric loss.

The method may further include: training the DECA system by using subsets of mesh vertices assigned to a neck region and a hair region, wherein the predicted mesh includes person-specific mesh offsets for non-facial regions while preserving the face shape predicted by the DECA system.

The rendering may include performing a camera transformation based on camera parameters corresponding to the target image. According to an aspect of an example embodiment of the disclosure, provided is an apparatus for three-dimensional (3D)-reconstruction of a human head for rendering a human image, the apparatus including: at least one memory configured to store program code; and at least one processor configured to access the program code and operate as instructed by the program code, the program code including: encoding code configured to cause the at least one processor to encode, by using a first convolutional neural network, a single source image into a neural texture, the neural texture having a same spatial size as the single source image and a larger number of channels than the single source image, the neural texture containing local person-specific details; estimating code configured to cause the at least one processor to estimate, by a pre-trained detailed expression capture and animation (DECA) system, a face shape, a facial expression, and a head pose by using the single source image and a target image, and provide an initial mesh as a set of faces and a set of initial vertices based on a result of estimation; c) providing code configured to cause the at least one processor to provide a predicted mesh of a head mesh based on the initial mesh and the neural texture; and d) rendering code configured to cause the at least one processor to rasterize 3D reconstruction of a human head based on the predicted mesh, and render a human image based on a result of the rasterizing.

The providing code may be further configured to cause the at least one processor to provide the predicted mesh by: rendering the initial mesh into an xyz-coordinate texture; concatenating the xyz-coordinate texture and the neural texture; processing, by using a second neural network, a result of the concatenating into a latent geometry map; and providing the predicted mesh by using the latent geometry map.

The providing code may be further configured to cause the at least one processor to provide the predicted mesh by: bilinear sampling the latent geometry map by using texture coordinates to obtain a vertex-specific feature; decoding the vertex-specific feature by a multi-layer perceptron for predicting a 3D offset for each vertex; and adding the predicted 3D offset to the initial vertices to obtain the predicted mesh.

The rendering code may be further configured to cause the at least one processor to process a result of the rasterizing by using a third neural network to obtain a predicted image and a segmentation mask.

The rendering code may be further configured to cause the at least one processor to reconstruct the predicted image and the segmentation mask based by comparing the predicted image and the segmentation mask with a ground-truth image and a mask of the ground-truth image via a photometric loss.

The program code may further include: training code configured to cause the at least one processor to train the DECA system by using subsets of mesh vertices assigned to a neck region and a hair region, and wherein the predicted mesh includes person-specific mesh offsets for non-facial regions while preserving the face shape predicted by the DECA system.

The rendering code may be further configured to cause the at least one processor to perform a camera transformation based on camera parameters corresponding to the target image.

According to an aspect of an example embodiment of the disclosure, provided is a computer readable medium containing instructions that when executed cause at least one processor to: a) encode, by using a first convolutional neural network, a single source image into a neural texture, the neural texture having a same spatial size as the single source image and a larger number of channels than the single source image, the neural texture containing local person-specific details; b) estimate, by a pre-trained detailed expression capture and animation (DECA) system, a face shape, a facial expression, and a head pose by using the single source image and a target image, and provide an initial mesh as a set of faces and a set of initial vertices based on a result of estimation; c) provide a predicted mesh of a head mesh based on the initial mesh and the neural texture; and d) rasterize 3D reconstruction of a human head based on the predicted mesh, and render a human image based on a result of the rasterizing.

BRIEF DESCRIPTION OF DRAWINGS

The above and/or other aspects will be more apparent by describing example embodiments with reference to the accompanying drawings, in which.

DETAILED DESCRIPTION

Embodiments of the disclosure provide three-dimensional of an object (e.g., a human head) in the form of polygonal mesh using a single image with animation and realistic rendering capabilities for novel head poses. Personalized human avatars are becoming the key technology across several application domains, such as telepresence, virtual worlds, online commerce. In many cases, it is sufficient to personalize only a part of the avatars' body. The remaining body parts may then be either chosen from a certain library of assets or omitted from the interface. Towards this end, many applications require personalization at the head level, e.g., creating person-specific head models. Creating personalized heads is an important and viable intermediate step between personalizing just face (which is often insufficient) and creating personalized full-body models, which is a much harder task that limits quality of the resulting models and/or requires cumbersome data collection.

Acquiring human avatars from a single photograph ("one-shot") offers the highest convenience for users, yet is particularly challenging and requires strong priors on human geometry and appearance. For faces, parametric models are long known to offer good personalization solution. Face models may also be learned from a relatively small dataset of 3D scans, and represent geometry using meshes and appearance using textures, which makes such models compatible with many computer graphics applications and pipelines. On the other hand, parametric face models cannot be trivially expanded to the whole head region due to large geometric variability of the non-facial parts such as hair and neck. In this work, parametric mesh-based modeling is extended to the human heads. In order to learn the increased geometric and photometric variability (compared to faces), the parametric models are learned directly from a large dataset of in-the-wild videos. Neural networks are used to parameterize both the geometry and the appearance. For the appearance modeling, the deferred neural rendering paradigm and a combination of neural textures and rendering networks may be used. A neural rendering framework is used to enable end-to-end training and to achieve high visual realism of the resulting head models. After training, both the geometric and the appearance neural networks may be conditioned on the information extracted from a single photograph, enabling one-shot realistic avatar generation.

To the best of knowledge, the system according to the disclosure is the first that is capable of creating realistic personalized human head models in a rigged mesh format from a single photograph. This distinguishes the model of the disclosure from a growing class of approaches that recover neural head avatars that lack explicit geometry, from another big class of approaches that may personalize the face region but not the whole head, and from commercial systems that create non-photorealistic mesh avatars from a single image. Alongside a full model, the disclosure provides a simplification of the full model based on linear blendshape basis and shows how such simplification and a corresponding feedforward predictor for blendshape coefficients may be trained (on the same video dataset).

Provided is a method for 3D-reconstruction of human head for obtaining render of human image, using a single source image, wherein face shape extracted from the single source image, head pose, the facial expression extracted from random target image, method implemented on device, having a CPU, internal memory storage with images, RAM, the method comprising the following steps:

a) reading the single source image from the device memory, and encoding, by first convolutional neural network, source image into a neural texture of the same spatial size as an original image, but with a larger number of channels, that contains local person-specific details;

b) in parallel, estimating at least one of face shape, facial expression, or head pose by pre-trained DECA (Detailed Expression Capture and Animation) system to both the source image and the target image, and providing an initial mesh as a set of faces and a set of initial vertices;

c) providing predicted mesh for non-face parts of the head mesh, wherein providing step comprising:
rendering the initial mesh into xyz-coordinate texture,
concatenating the xyz-coordinate texture and the neural texture,
processing a result of the concatenating with a second neural network into a latent geometry map,
bilinear sampling the latent geometry map using texture coordinates to obtain vertex-specific feature,
decoding vertex-specific feature by a multi-layer perceptron for predicting a 3D offset for each vertex,
adding the predicted 3D offset to initial vertices for obtaining 3D reconstruction of human head as the predicted mesh;

d) rasterizing 3D reconstruction of a human head for processing result by third network to obtain render of a human image.

At least one of the plurality of modules may be implemented through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The above-described method performed by the electronic device may be performed using an artificial intelligence model.

According to the disclosure, the method may obtain output data recognizing an image by using image data as input data for an artificial intelligence model. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

The method according to the disclosure is based on visual understanding, which is a technique for recognizing and processing things as human vision and includes, e.g., object recognition, object tracking, image retrieval, human recognition, scene recognition, 3D reconstruction/localization, or image enhancement.

A method according to an embodiment includes 3D reconstruction of a human head using a single source image xs, wherein a face shape extracted from the single source image xs, a head pose, and/or a facial expression extracted from a random target image xt, which may be taken both from the device's memory and from any suitable source of information, including Internet. This solution may be used for both desktop computers and mobile devices (e.g., smartphones) with a graphical processing unit. Also, for implementation an embodiment of the disclosure, a computer-readable medium may be used, e.g., a computer-readable medium containing a program, during execution of which in computer the method of an embodiment is carried out.

An algorithm according to the disclosure performs 3D reconstruction of a human head image and its realistic rendering, including capability for changing of a pose and an expression of a face.

An embodiment of the disclosure provides a method that jointly learns to produce photorealistic renders of human heads, as well as to estimate their 3D meshes using only the single source image xs and without any 3D supervision.

At the training step, used is a large-scale dataset of in-the-wild videos (e.g., live videos) with talking speakers. All frames in each video are assumed to depict the same person in the same environment (e.g., defined by lighting, hairstyle, and person's clothing).

At each training step, two random frames xs and xt are sampled from a random training video. Goal is to reconstruct and to render the target image $\hat{x}_t$ given:

a) the personal details and the face shape extracted from the source image xs, as well as b) the head pose, the facial expression, and the camera pose estimated from the target image xt.

The final reconstruction loss is backpropagated and used to update the parameters of the model components.

After training, it is possible to create a personalized head model by estimating all parameters from a single image. This model may then be animated using face tracking parameters extracted from any talking head sequence and rendered from a range of viewpoints similar to those present in the training dataset.

The method application is carried in two steps. The first step includes training the parameters of the algorithm using a large dataset (e.g., videos of talking people). After that the deployment of the learned algorithm is possible on less capable devices, like desktops and smartphones.

In case of hardware implementation, the target device may be any mobile phone with enough computational resources or any other consumer device that may require such an image synthesis (e.g., TV). In order to operate properly, such device needs to have a CPU, internal memory storage with images, RAM and a GPU. Neural processing unit might be also included in order to speed up computations. The input image is read from memory, the output image is written into memory and displayed on the screen.

Figure 1:
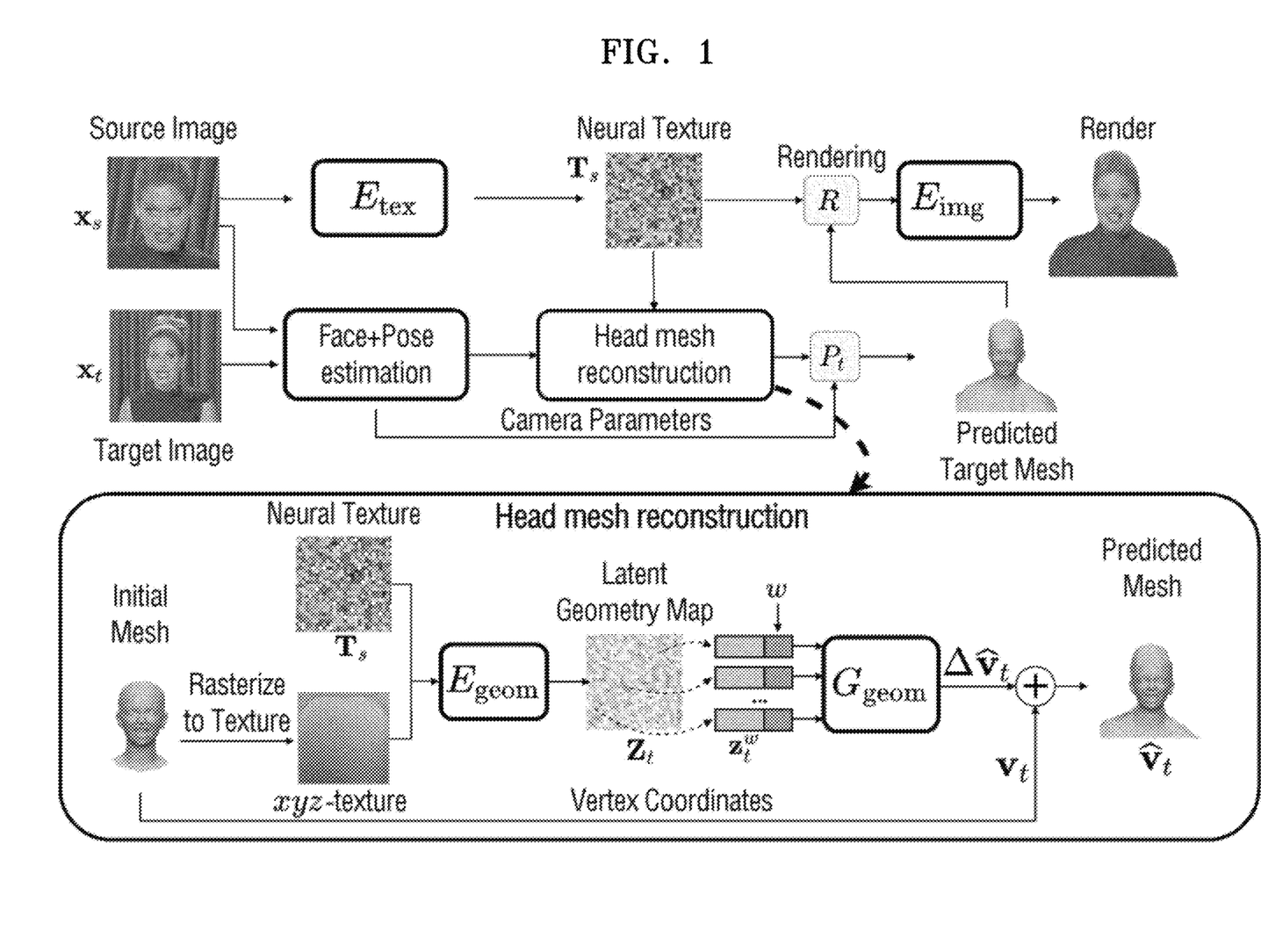
FIG. 1 schematically illustrates a method for three-dimensional (3D) reconstruction of an object using a single photo in a form of polygonal mesh.

FIG. 1 schematically illustrates a method for 3D-reconstruction of human heads in the form of polygonal mesh using a single image (e.g., a photo). While an application of the learned model is performed using the described algorithm, the training process specifies the parameters of neural networks, examples of which are illustrated in FIG. 1 as Etex, Eimg, Egeom, Ggeom. The training processing may be performed by using back-propagation algorithm and differentiable rendering algorithm, which are both publicly available. The loss function used during training consists of photometric and geometric terms.

A key feature of the method according to the disclosure is usage of solely 2D supervision on geometry, which allows training of the method on raw videos without any specifically gathered data like synthetic renders or 3D scans. Data that are used in the training process are videos with talking heads, which are not 3D data itself, but humans with heads.

The method of the disclosure obtains the 3D reconstruction by deforming a polygonal mesh, obtained from a parametric model, using neural networks. This allows 3D reconstruction using a single image in a record time.

To implement 3D reconstruction with a trained model, a device with a graphical processing unit is required, as well as libraries which support convolutional layers and other related modules, like nonlinearities and normalizations.

To obtain a trained model, a server with multiple graphical processing units is required.

An embodiment of the disclosure, as illustrated in FIG. 1, includes two main stages: (a) deferred neural rendering and (b) head mesh reconstruction.

In an example of a model according to the disclosure, jointly used are multiple neural networks that perform rendering and mesh reconstruction. The training pipeline proceeds as follows, with reference to FIG. 1:

Latent texture estimation.

The source image xs is encoded into a neural texture Ts that contains local person-specific details (describing both local appearance and geometry). The encoding is done by a convolutional neural network Etex.

Face and 3D pose estimation.

In parallel, applied is a pre-trained DECA (Detailed Expression Capture and Animation) system for face reconstruction to both the source image xs and the target image xt, (e.g., "Face+Pose estimation" in FIG. 1). DECA estimates face shapes, facial expressions, and head poses and uses the FLAME head model, with predefined mesh topology and blendshapes learned from 3D scans. The method of the disclosure uses the face shape from the source image xs as well as the facial expression and the camera pose from the target image xt, and provides, based on estimation by DECA, initial mesh as a set of faces and set of initial vertices for further processing.

Head mesh reconstruction (this is shown in FIG. 1 in the circled area on the bottom).

The vertices of the DECA mesh (initial mesh in FIG. 1) with personalized face region and generic non-facial parts are rendered into an xyz-coordinate texture (xyz-texture in FIG. 1) using the predefined texture mapping. The xyz-texture and the neural texture Ts are concatenated and processed with the U-Net network Egeom into a new texture map (latent geometry map in FIG. 1) Zt. It allows to produce offsets for each vertex of the mesh independently.

The latent geometry map is sampled bilinearly using texture coordinates $w$ ($w - z_t w$ in FIG. 1) to obtain vertex-specific feature. The 3D offsets for each mesh vertex are then decoded independently by the multi-layer perceptron Ggeom that predicts a 3D offset $\Delta \hat{v}_t$ for each vertex. This step reconstructs the personalized model for non-face parts of the head mesh (predicted mesh $\hat{v}_t$) in FIG. 1). The reconstructions are compatible with the topology/connectivity of the FLAME mesh.

Deferred Neural Rendering.

The personalized head mesh (predicted mesh) is rendered using the pose Pt operator (that rotates and translates mesh to target pose) estimated by DECA ("Face+Pose estimation" in FIG. 1) for the target image and with the superimposed neural texture Tx. The resulting render is processed by the decoding (rendering R in FIG. 1) U-Net network Eimg to obtain the predicted image $\hat{x}_t$ and the segmentation mask $\hat{s}_t$.

During training, the reconstruction is compared to the true image/mask, and the losses are used to update the components of the system according to the disclosure.

Below, details of each stage of training and the training losses are provided. The estimation of a simplified model that models head geometry using linear blend shape basis is also discussed.

The method of the disclosure uses a predefined head mesh with a corresponding texture coordinates xyz. Also, the described mesh reconstruction process does not change the face topology or texture coordinates of individual vertices. More specifically, the disclosure uses the FLAME head model that has N base vertices $v_{base} \in \mathbb{R}^{3N}$, and two sets K and L of basis vectors that encode shape $\mathcal{B} \in \mathbb{R}^{3N \times K}$ and expression $\mathcal{D} \in \mathbb{R}^{3N \times L}$. The reconstruction is carried out in two stages: the basis vectors are first blended using the two vectors of linear coefficients $\phi$ and $\psi$, and then the linear blend skinning function W is applied with parameters $\theta$, which rotates groups of vertices around linearly estimated joints. The final reconstruction in world coordinates may be expressed as follows:

$$v(\phi,\psi,\theta) = \mathcal{W}(v_{base} + \mathcal{B}\phi + \mathcal{D}\psi, \theta). \quad (1)$$

In the related art, these parameters are estimated via photometric optimization. More recently, learning based methods capable of single-view reconstruction started to emerge, which use a pre-trained DECA system that provides an initial head reconstruction (in the form of FLAME parameters).

During training, the disclosure applies DECA to both source image $x_s$ and the target image $x_t$. The face shape parameters from the source image $x_s$ alongside the expression, head pose and camera pose parameters from the target image $x_t$ are then used to reconstruct the initial FLAME vertices $v(\phi_s, \psi_t, \theta_t)$, as well as estimate the camera matrix $\mathcal{P}_t$.

The FLAME vertices vt estimated by DECA provide good reconstructions for the face region but lack any person-specific details in the remaining parts of the head (e.g., hair, clothing). To alleviate that, predicted is person-specific mesh offsets for non-facial regions while preserving the face shape predicted by DECA. Ear regions are additionally excluded since their geometry in the initial mesh (a set of faces and set of initial vertices) is too complex to be learned from in-the-wild video datasets.

These mesh offsets are estimated in two steps. First, encoded are both vertex texture and the neural texture Ts into the latent geometry texture map Zt via a UNet network Egeom. It allows the produced latent map to contain both positions of the initial vertices vt, and their semantics, provided by the neural texture.

From Zt the vectors are obtained by bilinear interpolation at fixed texture coordinates w. The vectors $Z_t w$ and their coordinates $w$ are then concatenated and passed through a multi-layer perceptron Ggeom independently for each vertex in the mesh to predict the offsets $\Delta \hat{v}_t$. These offsets are then zeroed out for face and ear regions, and the final reconstruction in world coordinates is obtained as follows:

$$\hat{v}_t = v_t + \Delta \hat{v}_t. \quad (2)$$

Equation (2) characterizes adding the predicted 3D offset to initial vertices for obtaining 3D reconstruction of human head as the predicted mesh.

Deferred Neural Rendering

Rendered are the reconstructed head vertices $\hat{v}_t$ using the topology and texture coordinates $w$ from the FLAME model with the superimposed neural texture Ts. For that, a differentiable mesh renderer R with the camera matrix Pt estimated by DECA for the target image xt are used.

The resulting rasterization is processed by the rendering (decoding) network Eimg to obtain the predicted image $\hat{x}_t$ and the segmentation mask $\hat{s}_t$. Eimg includes two UNets that separately decode an image and a mask. The result of the deferred neural rendering is the reconstruction of the target image $\hat{x}_t$ and its mask $\hat{s}_t$, which is compared to the ground-truth image xt and mask st via a photometric loss.

Training Objectives

In the method according to the disclosure, learned is geometry without any groundtruth 3D supervision during training or pre-training (on top of the pretrained DECA estimator). For that utilized are two types of objectives: segmentation-based geometric losses $\mathcal{L}_{geom}$ and photometric losses $\mathcal{L}_{photo}$.

Explicitly assigning subsets of mesh vertices to the neck and the hair regions helps a lot with the quality of final deformations. It allows to introduce a topological prior for the predicted offsets. In the predictions, hair has no holes and is topologically equivalent to a half-sphere (a disk), while neck and clothing are equivalent to a cylinder. Without this explicit prior, method of the disclosure fails to generate view-consistent reconstructions.

To evaluate the geometric losses, calculated are two separate occupancy masks using a soft rasterization operation. First, $\hat{o}_t^{hair}$ is calculated with detached neck vertices, so that the gradient flows through that mask only to the offsets corresponding to the hair vertices, and then $\hat{o}_t^{hair}$ is calculated with detached hair vertices. The hair occupancy mask is matched to the ground-truth mask $s_t^{hair}$ (which covers the hair, face, and ears), and the neck occupancy mask is matched to the whole segmentation mask st:

$$\mathcal{L}_{OCC} = \lambda_{hair} \|\hat{o}_t^{hair} - s_t^{hair}\|_2^2 + \lambda_{neck} \|\hat{o}_t^{neck} - s_t\|_2^2. \quad (3)$$

Also used is an auxiliary Chamfer loss to ensure that the predicted mesh vertices cover the head more uniformly. Specifically, matched are the 2D coordinates of the mesh vertices, projected into the target image, to the head segmentation mask. Let denote the subset of predicted mesh vertices, visible in the target image, as $\hat{p}_t = \mathcal{P}_t'(\hat{v}_t)$ and the number of these vertices as Nt, so that $\hat{p}_t \in \mathbb{R}^{N_t \times 2}$. Notice that operator $\mathcal{P}_t'$ here not only does the camera transformation, but also discards the z coordinate of the projected mesh vertices. To compute the loss, the disclosure then samples Nt 2D points from the segmentation mask st and estimate the Chamfer distance between the sampled set of points pt and the vertex projections:

$$\mathcal{L}_{chm} = \qquad (4)$$

$$\frac{1}{2N_t} \sum_{\hat{p}_t \in \hat{p}_t} \left\| \hat{p}_t - \operatorname*{argmin}_{p \in p_t} \| p - \hat{p}_t \| \right\| + \frac{1}{2N_t} \sum_{p_t \in p_t} \left\| p_t - \operatorname*{argmin}_{\hat{p} \in \hat{p}_t} \| \hat{p} - p_t \| \right\|.$$

Lastly, the disclosure regularizes the learned geometry using the Laplacian penalty. It was initially found that regularizing offsets $\Delta \hat{v}$ worked better than regularizing full coordinates $\hat{v}$ and stuck to that approach for all experiments. The Laplacian loss may be written as:

$$\mathcal{L}_{lap} = \frac{1}{V} \sum_{i=1}^{V} \left\| \Delta \hat{v}_i - \frac{1}{\mathcal{N}(i)} \sum_{j \in \mathcal{N}(i)} \Delta | \hat{v}_j \right\|_1, \qquad (5)$$

where $\mathcal{N}(i)$, denotes a set indices for vertices adjacent to the i-th vertex in the mesh.

The final geometric loss that is used to learn head mesh reconstruction is:

$$\mathcal{L}_{geom} = \mathcal{L}_{OCC} + \lambda_{chm} \mathcal{L}_{chm} + \lambda_{lap} \mathcal{L}_{lap}. \qquad (6)$$

Photometric optimization matches the obtained and the ground truth images. Photometric loss terms not only allow to obtain photorealistic renders but also aid in learning proper geometric reconstructions. The photometric terms include the perceptual loss, the face recognition loss and the multiresolution adversarial loss. The disclosure uses the Dice loss to match segmentation masks. Therefore, the following combination of losses is used:

$$\mathcal{L}_{photo} = \lambda_{per} \mathcal{L}_{per} + \lambda_{idt} \mathcal{L}_{idt} + \lambda_{adv} \mathcal{L}_{adv} + \lambda_{seg} \mathcal{L}_{seg}. \qquad (7)$$

The final objective is a sum of the geometric and the photometric losses:

$$\mathcal{L} = \mathcal{L}_{geom} + \mathcal{L}_{photo}. \qquad (8)$$

Linear Deformation Model

In addition to the full non-linear model of the disclosure described above, considered is a simplified parametric model with a linear basis of offsets. While this model is similar to parametric models, the method according to the disclosure still do not use 3D scans for training and rather obtain linear model by "distilling" non-linear model. Also trained is a feedforward regressor that predicts the linear coefficients from an input image.

The motivation for training this additional model is to show that the deformations learned by the method of the disclosure may be approximated using a system with a significantly lower capacity. Such a simple regression model may be easier to apply for inference on low-performance devices.

To train the linear model, first obtained is the basis of offsets $\mathcal{F} \in \mathbb{R}^{3N \times K}$, which is similar to the ones used in the FLAME parametric model. This basis is obtained by applying a low-rank PCA to the matrix of offsets $\Delta v \in \mathbb{R}^{3N \times M}$, calculated using M images from the dataset. The disclosure discards most of the basis vectors and only keeps K components corresponding to maximal singular values. The approximated vertex offsets $\tilde{v}$ for each image may then be estimated via the following expression:

$$\tilde{v} = \mathcal{F} \eta, \qquad (9)$$

where $\eta$ may be obtained by applying the pseudo-inverse of a basis matrix F to the corresponding offsets $\Delta \hat{v}$:

$$\eta = (\mathcal{F}^T \mathcal{F})^{-1} \mathcal{F}^T \Delta \hat{v} \qquad (10)$$

Then trained is the regression network by estimating a vector of basis coefficients $\eta_r$, given an image $x_r$. For that, minimized is the mean square error (MSE) loss $\|\hat{\eta}_r - \eta_r\|_2^2$ between the estimated coefficients and the ground truth.

The method of the disclosure is trained on the VoxCeleb2 dataset of videos. This large-scale dataset contains an order of 105 videos of 103 different speakers. It is widely used to train talking head models. However, the main drawback of this dataset is the mixed quality of videos and the heavy bias towards frontal poses.

To address these limitations, this dataset is processed by using an off-the-shelf image quality analysis model and a 3D face-alignment network]. Then filtered are the data which has poor quality and non-diverse head rotations. The final training dataset has ≈15000 sequences. Although filtering/pruning may not fully solve the problem of head rotation bias, and the method of the disclosure still works best in frontal views.

Also used is the H3DS dataset of photos with associated 3D scans to evaluate the quality of head reconstructions.

Implementation Details

In the experiments, used are a two-stage training. During the first stage, all networks are jointly trained for 1·105 iterations, but offsets are applied only to hair vertices and disable the neck and the 2D Chamfer losses. Used is the following weights: $\lambda$hair=100, $\lambda$per=1, $\lambda$idt=0.1, $\lambda$adv=0.1, $\lambda$seg=10. After that, started is estimating offsets for neck vertices, and training for another 5·104 iterations. Reduced is the hair segmentation loss ($\lambda$hair=10) and enable the neck and the 2D Chamfer loss ($\lambda$neck=10, $\lambda$chm=0.01). Also applied is different penalties to the vertices which correspond to neck and hair regions during training. For neck vertices, set is $\lambda$lap=10, while for the hair vertices, set is $\lambda$lap=1.

According to the disclosure, models are trained at 256×256 resolution using ADAM with the fixed learning rate of 10-4, $\beta$1=0, ($\beta$2=0.999, and a batch size of 32. For more details, please refer to the supplementary materials.

Evaluation

3D Reconstruction.

ROME according to the method of the disclosure achieves more realistic renders, as well as better matches the head geometry than H3D-Net in the single-shot mode. An important advantage of ROME is that the resulting avatars are ready for animation.

The head reconstruction quality is evaluated using a novel H3DS dataset. Compared is against the related art head reconstruction method H3D-Net, which uses signed distance functions to represent the geometry. While providing great reconstruction quality in the sparse-view scenario, their approach has several limitations. For example, H3D-Net requires a dataset of full head scans to learn the prior on head shapes. Additionally, it has no built-in animation capabilities and requires fine-tuning per scene, while the method of the disclosure works in a feed-forward way.

The comparison is made with H3D-Net in a single view scenario, which is native for method of the disclosure but is beyond the capabilities in the related art. H3D-Net is used in the comparison because it is believed to be close to the system of the disclosure in terms of single-view reconstruction capabilities in the related art.

Figure 2:
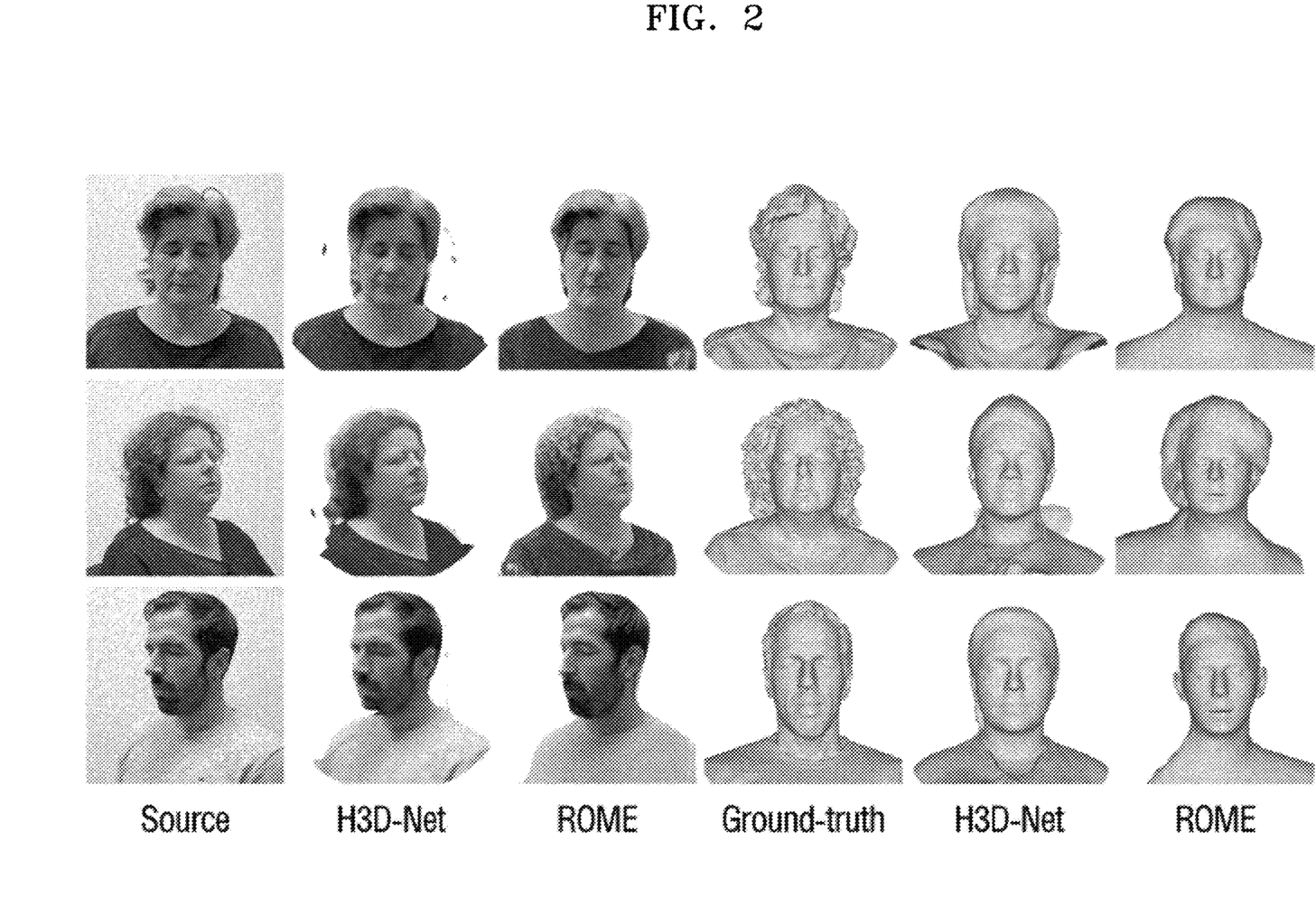
FIG. 2 illustrates qualitative comparison on representative cases for the H3DS dataset.

FIG. 2 illustrates qualitative comparison on representative cases for the H3DS dataset. For each column: 1st—source image, 2nd—H3D-Net rendering result, 3D rendering result of the disclosure, 4th—ground true mesh (from H3D dataset), 5th—H3D-Net mesh predicted, 6th—ROME (the method of the disclosure) predicted mesh. Evaluated are the method of the disclosure and H3D-Net both for frontal- and side-view reconstruction. Noted is significant overfitting of H3D-Net to the visible hair geometry, while the model according to the disclosure provides reconstructions more robust to the change of viewpoint.

In total, compared are the models according to the disclosure on all scans available in the test set of the H3DS dataset, and each scan was reconstructed from 3 different viewpoints. The measured mean Chamfer distance across all scans is 15.1 mm for H3D-Net, and 13.2 mm for the method of the disclosure.

Figure 3:
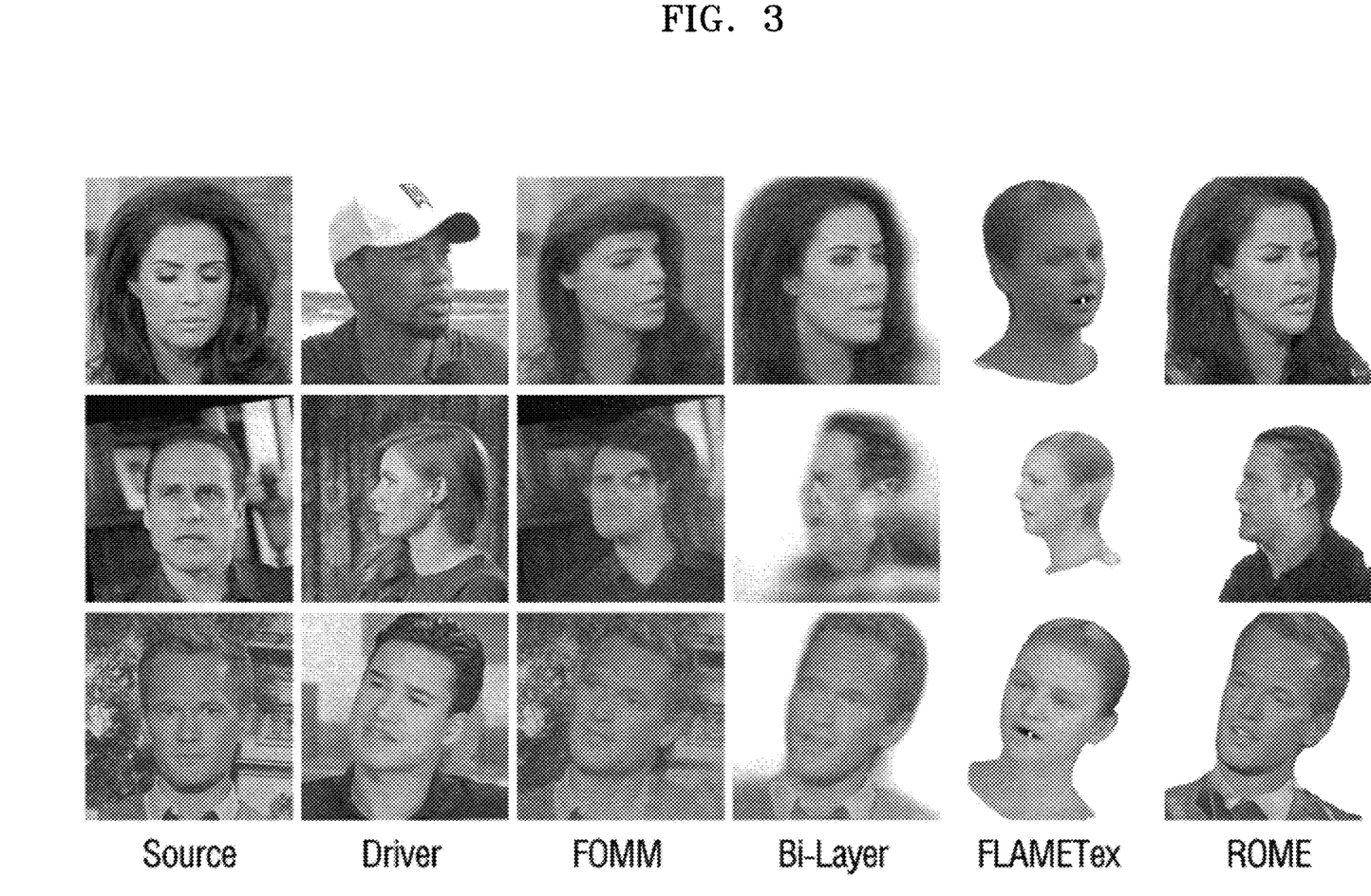
FIG. 3 illustrates comparison of renders on a VoxCeleb2 dataset. The task is to reenact the source image with the expression and pose of the driver image.

FIG. 3 illustrates comparison of renders on a VoxCeleb2 dataset. The task is to reenact the source image with the expression and pose of the driver image. Here, picked are diverse examples in terms of pose variation to highlight the differences in performance of compared methods. For the large head pose rotations, it is shown that purely neural-based methods (FOMM, Bi-Layer) have difficulty to maintain consistent quality.

In comparison, the rendering method (ROME) according to the disclosure produces images that are more robust to pose changes.

Additionally, included is a FLAMETex method, which is employed in the related art one-shot face reconstruction systems but is notable to personalize the avatar at the head level.

Evaluated is the quality of renders of the disclosure on the hold-out subset VoxCeleb2 dataset. Used is a cross-driving comparison scenario for qualitative comparison to highlight the animation capabilities of the method of the disclosure, and self-driving scenario for quantitative comparison.

First, compared are with a FLAMETex rendering system, which works explicitly with mesh rendering. From the source image, FLAMETex estimates the albedo via a basis of RGB textures, and then combines it with predicted scene-specific shading. In contrast, the method of the disclosure predicts a rendered image directly and avoids complexity of explicit albedo-shading decomposition.

Then conducted is comparing with publicly available geometryfree rendering methods, which were trained on the same dataset. For that, the solution of the disclosure uses the First-Order Motion Model (FOMM) and the Bi-Layer Avatar Model. Both these systems bypass explicit 3D geometry estimation and rely only on learning the scene structure via the parameters of generative ConvNets. Other methods, which internally utilize some 3D structures, like camera rotations, were out of the scope of the comparison due to the unavailability of pre-trained models.

Presented are the qualitative comparison in FIG. 3, and a quantitative comparison across a randomly sampled holdout VoxCeleb2 subset in Table 1.

| | self-reenactment | | |
|---|---|---|---|
| Method | LPIPS↓ | SSIM↑ | PSNR↑ |
| FOMM | 0.09 | 0.87 | 25.8 |
| Bi-Layer | 0.12 | 0.83 | 22 |
| ROME | 0.08 | 0.86 | 25.8 |

Table 1 presents the quantitative results on the VoxCeleb2 dataset in the self-reenactment mode. The ROME system according to the disclosure outperforms FOMM (in the most perceptually-plausible LPIPS metrics) when the poses are filtered to include only large changes.

The foregoing embodiments are examples and are not to be construed as limiting. In addition, the description of the example embodiments is intended to be illustrative, and not to limit the scope of the claims, and many alternatives, modifications, and variations will be apparent to those skilled in the art.

Figure 4:
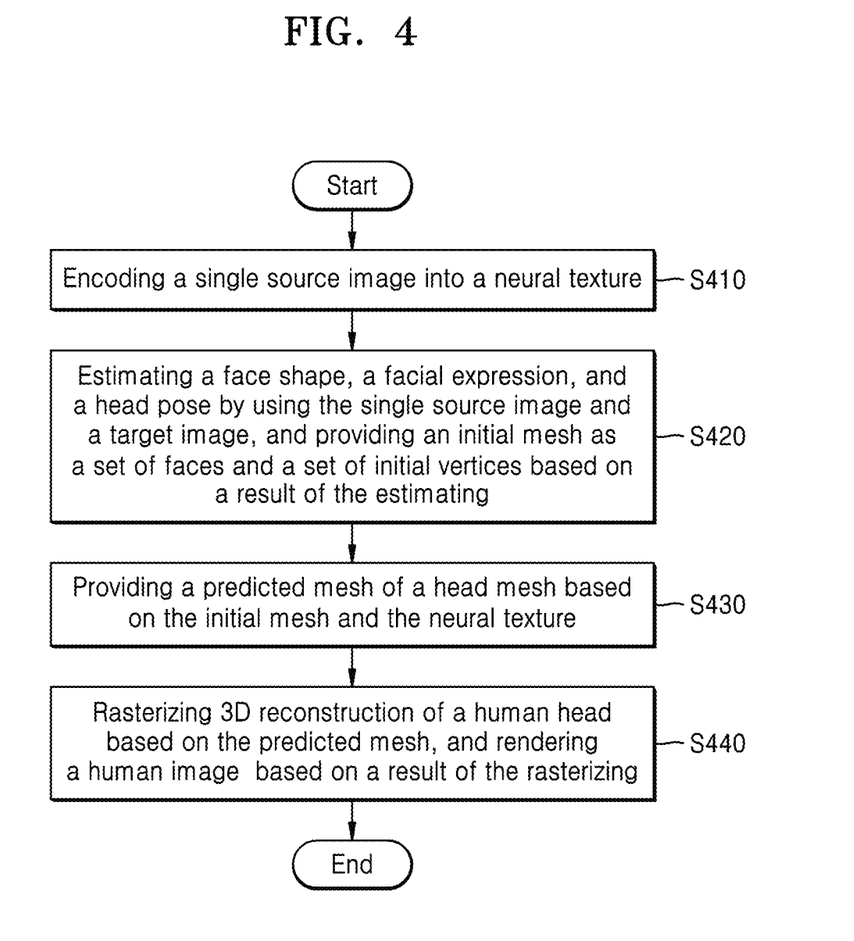
FIG. 4 illustrates a flowchart of a method for three-dimensional (3D)-reconstruction of a human head for rendering a human image according to an embodiment.

FIG. 4 illustrates a flowchart of a method for 3D reconstruction of a human head for rendering a human image according to an embodiment. For convenience of explanation, the same description as that made with reference to FIGS. 1 through 3 will be omitted.

In step S410, the method comprises, encoding, by using a first convolutional neural network, a single source image into a neural texture, the neural texture having a same spatial size as the single source image and a larger number of channels than the single source image, the neural texture containing local person-specific details.

In step S420, the method comprises, estimating, by a pre-trained detailed expression capture and animation (DECA) system, a face shape, a facial expression, and a head pose by using the single source image and a target image, and providing an initial mesh as a set of faces and a set of initial vertices based on a result of the estimating.

In step S430, the method comprises, providing a predicted mesh of a head mesh based on the initial mesh and the neural texture.

In step S440, the method comprises, rasterizing 3D reconstruction of a human head based on the predicted mesh, and rendering a human image based on a result of the rasterizing.

Figure 5:
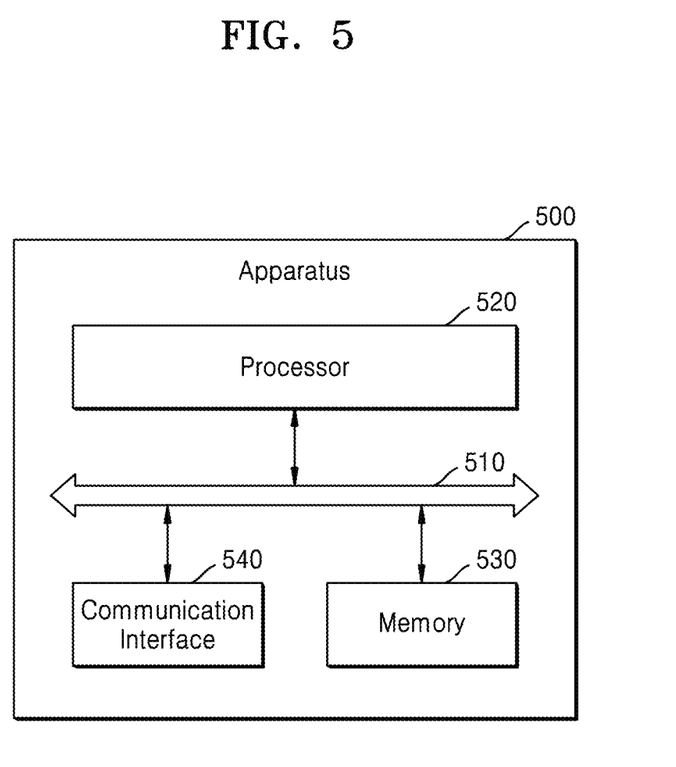
FIG. 5 illustrates an apparatus for 3D reconstruction of a human head for rendering a human image.

FIG. 5 illustrates an apparatus for 3D reconstruction of a human head for rendering a human image. Referring to FIG. 5, the apparatus 500 may include a bus 510, a processor 520, a memory 530, and a communication interface 540. For convenience of explanation, the same description as that made with reference to FIGS. 1 through 4 will be omitted.

The bus 510 connects the other components to each other, and the bus 110 may be a component communicating (e.g., control messages or data) between the other components.

The processor 520 may receive a control message or data from other component (e.g., the memory 530, the communication interface 540) through, for example, the bus 510, may interpret the received control message or data, and may execute control, computation or data processing according to the interpreted result.

In an embodiment, the processor 520 may perform at least a part of the functions (or instructions) of the method or apparatus illustrated with reference to FIGS. 1 through 4. For example, the processor 520 may encode, by using a first convolutional neural network, a single source image into a neural texture, the neural texture having a same spatial size as the single source image and a larger number of channels than the single source image, the neural texture containing local person-specific details. The processor 520 may estimate, by a pre-trained detailed expression capture and animation (DECA) system, a face shape, a facial expression, and a head pose by using the single source image and a target image, and provide an initial mesh as a set of faces and a set of initial vertices based on a result of estimation. The processor 520 may provide a predicted mesh of a head mesh based on the initial mesh and the neural texture. The processor 520 may rasterize 3D reconstruction of a human head based on the predicted mesh, and render a human image based on a result of the rasterizing.

The memory 530 may store a control message or data received from another component (e.g., the communication interface 540) or a control message or data generated by the processor 520 or other component. The memory 530 may retain programming modules including, for example, a kernel, middleware, an application programming interface (API), or an application. The programming modules may be configured in software, firmware, hardware or a combination of two or more thereof. The memory 530 may store instructions or program code.

The communication interface 540 may interface communication between the apparatus or an external apparatus (e.g., an electronic device or a server). For example, the communication interface 540 may be wiredly or wirelessly connected with a network to communicate with the external apparatus. The wireless connection may be made by various radio communication protocols, including, but not limited to, wireless fidelity (WiFi), Bluetooth (BT), near field communication (NFC), global positioning system (GPS), or cellular communication protocols (e.g., Long Term Evolution (LTE), LTE-Advanced (LTE-A), Code Division Multiple Access (CDMA), Wideband CDMA (WCDMA), Universal Mobile Telecommunication Systems (UMTS), Wireless Broadband (WiBro) or Global System for Mobile communications (GSM)). The wired connection may be made by various wired communication protocols, including, but not limited to, universal serial bus (USB), high definition multimedia interface (HDMI), recommended standard 232 (RS-232), or plain old telephone service (POTS). For example, the communication interface 540 may receive a single source image. The communication interface 540 may receive a target image. The communication interface 540 may send a rendered human image to other apparatus or a server.

What is claimed is:

1. A method for three-dimensional (3D)-reconstruction of a human head for rendering a human image, the method being performed by a device including at least one processor and at least one memory, the method comprising:
   a) encoding, by using a first convolutional neural network, a single source image into a neural texture, the neural texture having a same spatial size as the single source image and a larger number of channels than the single source image, the neural texture containing local person-specific details;
   b) estimating, by a pre-trained detailed expression capture and animation (DECA) system, a face shape, a facial expression, and a head pose by using the single source image and a target image, and providing an initial mesh as a set of faces and a set of initial vertices based on a result of the estimating;
   c) providing a predicted mesh of a head mesh based on the initial mesh and the neural texture; and
   d) rasterizing 3D reconstruction of a human head based on the predicted mesh, and rendering a human image based on a result of the rasterizing,
   wherein the providing the predicted mesh comprises:
   rendering the initial mesh into an xyz-coordinate texture;
   concatenating the xyz-coordinate texture and the neural texture;
   processing, by using a second neural network, a result of the concatenating into a latent geometry map;
   bilinear sampling the latent geometry map by using texture coordinates to obtain a vertex-specific feature;
   decoding the vertex-specific feature by a multi-layer perceptron for predicting a 3D offset for each vertex; and
   adding the predicted 3D offset to the initial vertices to obtain the predicted mesh.

2. The method according to claim 1, wherein the rendering comprises processing a result of the rasterizing by using a third neural network to obtain a predicted image and a segmentation mask.

3. The method according to claim 2, wherein the rendering comprises reconstructing the predicted image and the segmentation mask based by comparing the predicted image and the segmentation mask with a ground-truth image and a mask of the ground-truth image via a photometric loss.

4. The method according to claim 1, further comprising:
   training the DECA system by using subsets of mesh vertices assigned to a neck region and a hair region,
   wherein the predicted mesh includes person-specific mesh offsets for non-facial regions while preserving the face shape predicted by the DECA system.

5. The method according to claim 1, wherein the rendering comprises performing a camera transformation based on camera parameters corresponding to the target image.

6. An apparatus for three-dimensional (3D)-reconstruction of a human head for rendering a human image, the apparatus comprising:
   at least one memory configured to store program code; and
   at least one processor configured to access the program code and operate as instructed by the program code, the program code including:
   a) encoding code configured to cause the at least one processor to encode, by using a first convolutional neural network, a single source image into a neural texture, the neural texture having a same spatial size as the single source image and a larger number of channels than the single source image, the neural texture containing local person-specific details;
   b) estimating code configured to cause the at least one processor to estimate, by a pre-trained detailed expression capture and animation (DECA) system, a face shape, a facial expression, and a head pose by using the single source image and a target image, and provide an initial mesh as a set of faces and a set of initial vertices based on a result of estimation;
   c) providing code configured to cause the at least one processor to provide a predicted mesh of a head mesh based on the initial mesh and the neural texture; and
   d) rendering code configured to cause the at least one processor to rasterize 3D reconstruction of a human head based on the predicted mesh, and render a human image based on a result of the rasterizing,
   wherein the providing code is further configured to cause the at least one processor to provide the predicted mesh by:
   rendering the initial mesh into an xyz-coordinate texture;
   concatenating the xyz-coordinate texture and the neural texture;
   processing, by using a second neural network, a result of the concatenating into a latent geometry map;
   bilinear sampling the latent geometry map by using texture coordinates to obtain a vertex-specific feature;
   decoding the vertex-specific feature by a multi-layer perceptron for predicting a 3D offset for each vertex; and
   adding the predicted 3D offset to the initial vertices to obtain the predicted mesh.

7. The apparatus according to claim 6, wherein the rendering code is further configured to cause the at least one processor to process a result of the rasterizing by using a third neural network to obtain a predicted image and a segmentation mask.

8. The apparatus according to claim 7, wherein the rendering code is further configured to cause the at least one processor to reconstruct the predicted image and the segmentation mask based by comparing the predicted image and the segmentation mask with a ground-truth image and a mask of the ground-truth image via a photometric loss.

9. The apparatus according to claim 6, wherein the program code further comprises:

training code configured to cause the at least one processor to train the DECA system by using subsets of mesh vertices assigned to a neck region and a hair region, and wherein the predicted mesh includes person-specific mesh offsets for non-facial regions while preserving the face shape predicted by the DECA system.

10. The apparatus according to claim 6, wherein the rendering code is further configured to cause the at least one processor to perform a camera transformation based on camera parameters corresponding to the target image.

11. A non-transitory computer readable medium containing instructions that when executed cause at least one processor to:

a) encode, by using a first convolutional neural network, a single source image into a neural texture, the neural texture having a same spatial size as the single source image and a larger number of channels than the single source image, the neural texture containing local person-specific details;

b) estimate, by a pre-trained detailed expression capture and animation (DECA) system, a face shape, a facial expression, and a head pose by using the single source image and a target image, and provide an initial mesh as a set of faces and a set of initial vertices based on a result of estimation;

c) provide a predicted mesh of a head mesh based on the initial mesh and the neural texture; and d) rasterize 3D reconstruction of a human head based on the predicted mesh, and render a human image based on a result of the rasterizing, wherein the instructions, in providing the predicted mesh, cause the at least one processor to:

render the initial mesh into an xyz-coordinate texture;

concatenate the xyz-coordinate texture and the neural texture;

process, by using a second neural network, a result of the concatenating into a latent geometry map; and bilinear sampling the latent geometry map by using texture coordinates to obtain a vertex-specific feature;

decoding the vertex-specific feature by a multi-layer perceptron for predicting a 3D offset for each vertex; and adding the predicted 3D offset to the initial vertices to obtain the predicted mesh.

* * * * *